Jan. 6, 1970   J. W. CRANE ET AL   3,487,771
BALER
Filed May 4, 1967   3 Sheets-Sheet 1
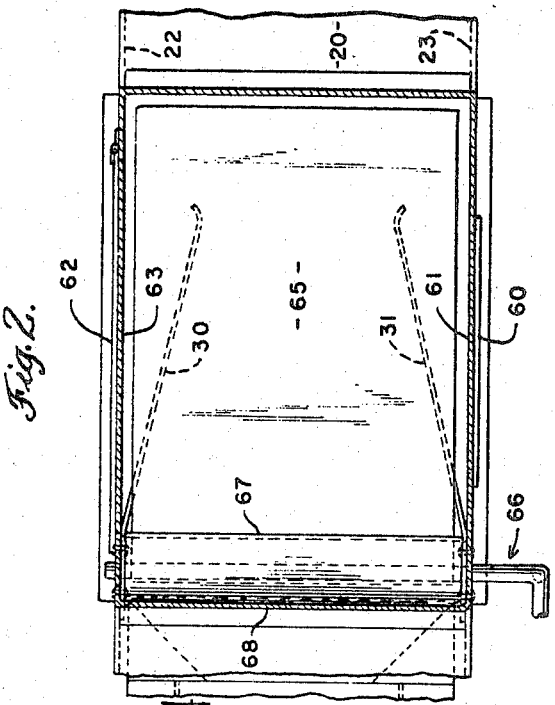
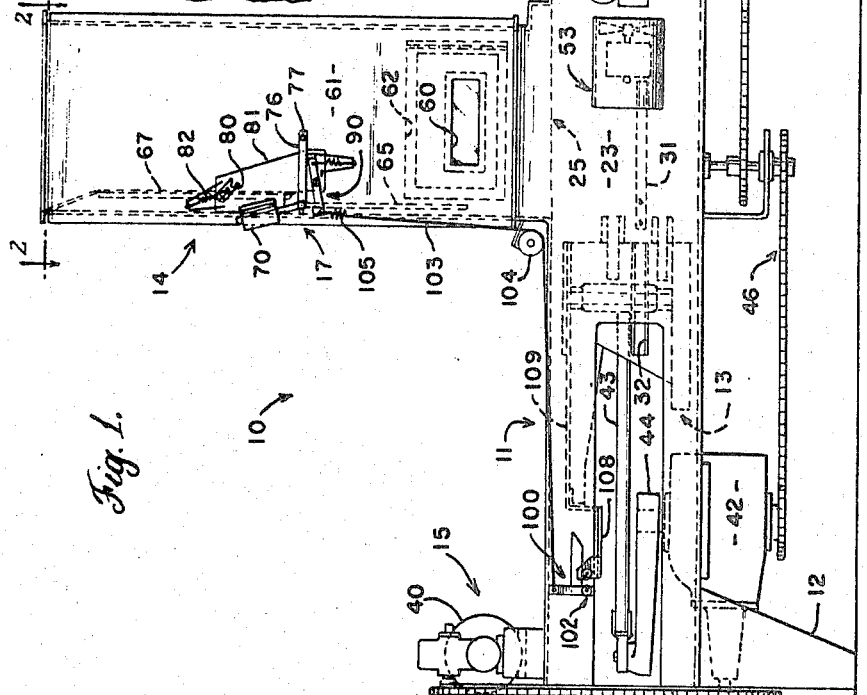
INVENTORS
JACK W. CRANE &
JAMES R. BURKHOLDER
BY Donald D. Schaper
ATTORNEY

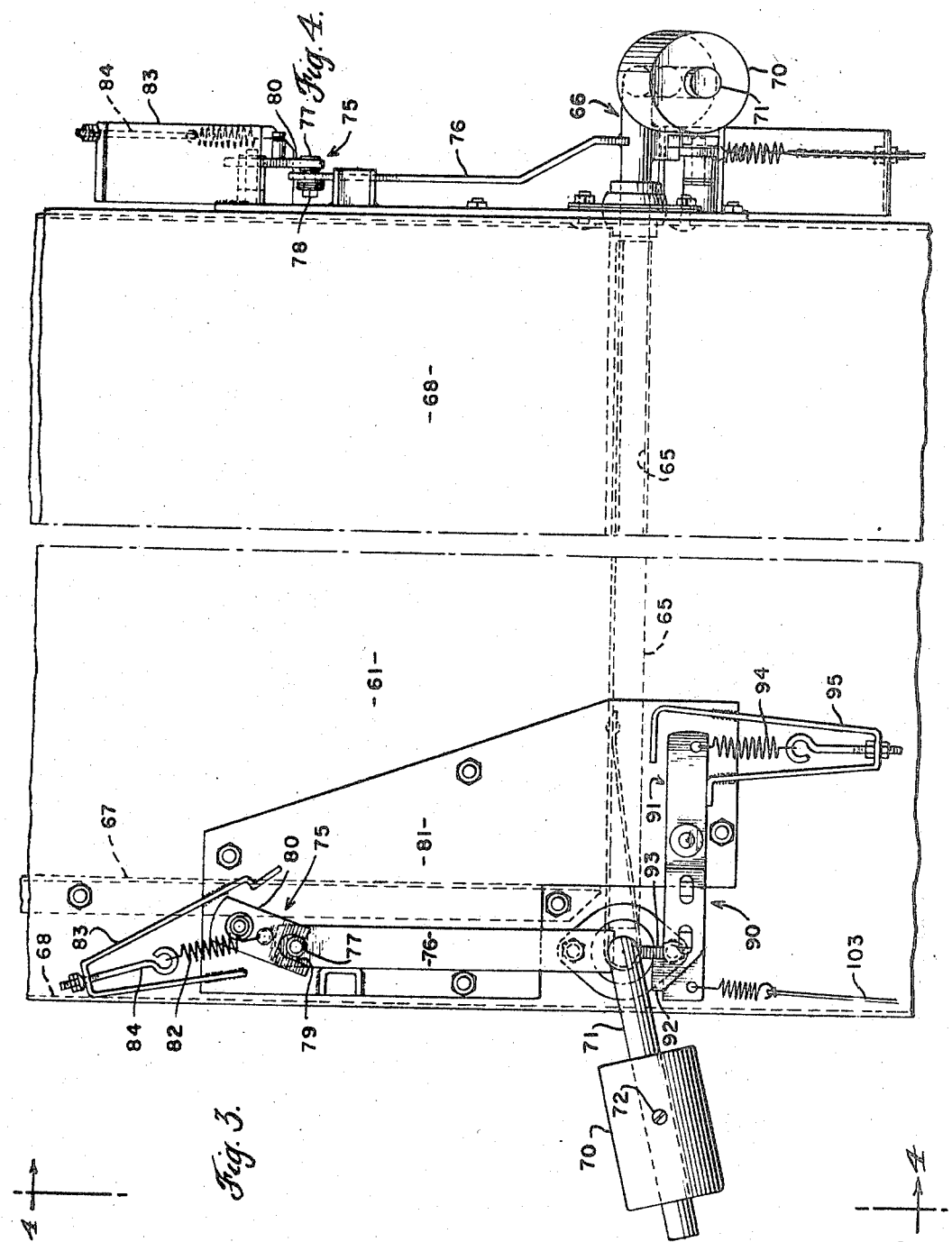

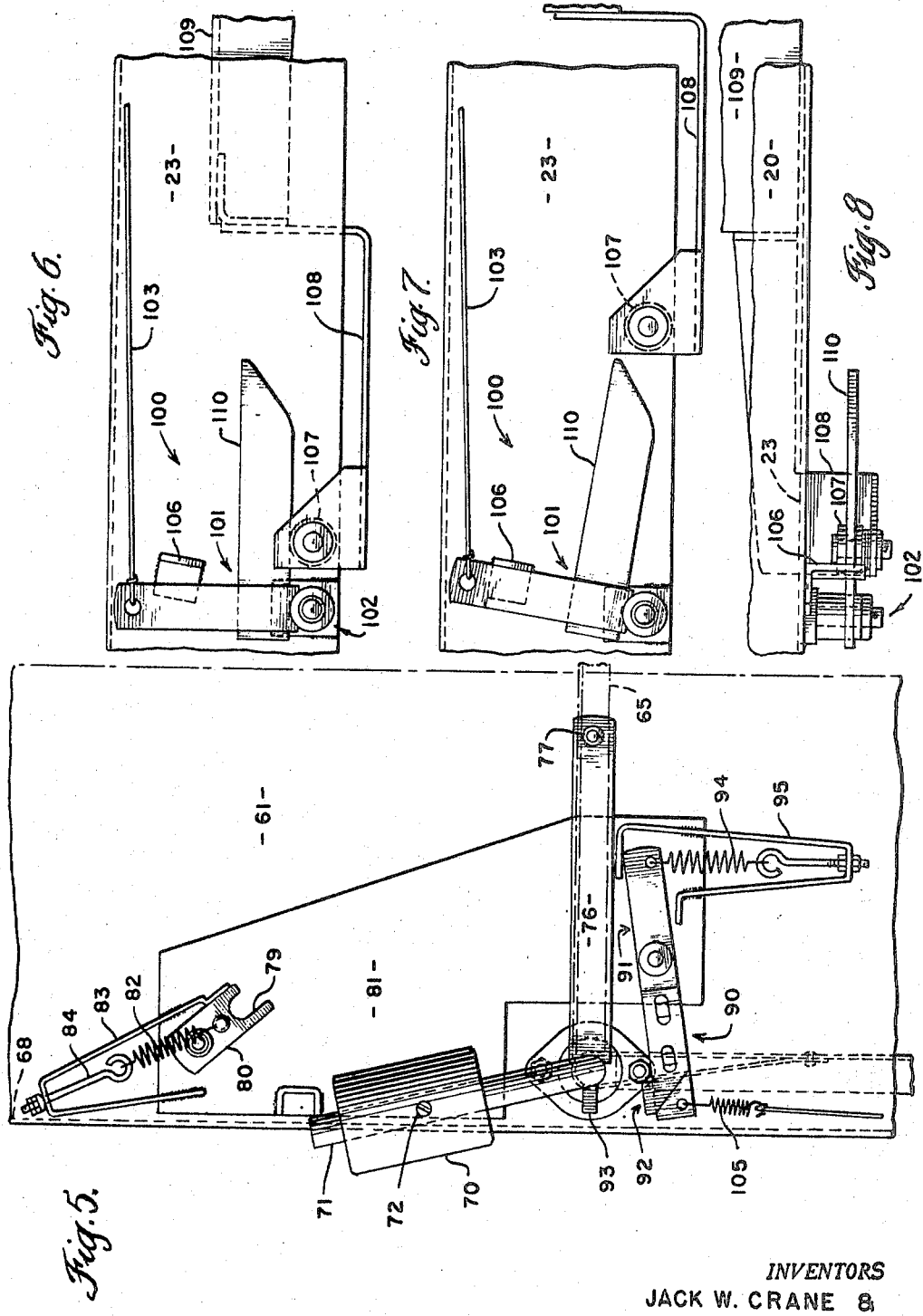

United States Patent Office 3,487,771
Patented Jan. 6, 1970

3,487,771
BALER
Jack W. Crane, New Holland, and James R. Burkholder, Ephrata, Pa., assignors to Sperry Rand Corporation, New Holland, Pa., a corporation of Delaware
Filed May 4, 1967, Ser. No. 636,111
Int. Cl. B30b 15/30, 1/32
U.S. Cl. 100—45         8 Claims

ABSTRACT OF THE DISCLOSURE

An apparatus adapted to form material into bales and having a metering device for feeding charges of material of a predetermined size into the baling chamber at a definite time in the baling cycle.

Background of the invention

This invention relates to balers which are adapted to bale waste paper, cotton mote, rags, or the like. These balers are generally of the stationary type and comprise a horizontally extending bale case and a reciprocating plunger mounted in the bale case. The plunger may be hydraulically operated, or mechanically driven through a crank mechanism. A tying mechanism is provided on the bale case to secure the material in the compressed form. Material is fed into the bale case through a hopper or feed chute supported on a top wall of the bale case.

Balers of the type described are normally installed next to the source of material to be baled, and the material is conveyed to the baler through ducts, or by other means. The material is usually not produced at a constant rate, and thus, one of the main problems is to operate and feed the balers so that a uniform bale is produced. One solution to this problem has been to provide manually operated, or automatic, mechanisms which start the baler when sufficient material has been accumulated and stop the baler when the available material has been baled.

Summary of the invention

Applicants' invention is directed to a baler which is adapted to operate continuously and automatically in an industrial operation. The baler is particularly suited to handle light fluffy materials, such as cotton mote. A generally horizontal longitudinally extending bale case is supported at opposite ends, and a plunger is mounted for reciprocating movement in the bale case. The plunger is continuously driven through a crank mechanism by a motor located on the top wall of the bale case. Since the baler operates continuously, it can be driven at a slow speed, and thus, only a relatively small motor is required to power the baler. An automatic tying mechanism is located on one of the bale case side walls, and a feed chute or hopper is mounted on the top wall of the bale case in communication with the baling chamber.

A metering device extending into the hopper is adapted to feed uniform charges of material into the baling chamber when the plunger is in its retracted position. The metering device comprises a door pivotally mounted in the hopper and movable from a horizontal closed position to a generally vertical open position. The door is held in a closed position by a counterweight and an over-center mechanism, both of which can be overcome when a sufficient weight of material has been accumulated on the door. A control means prevents actuation of the counterweight and over-center mechanism, however, except when the plunger is in the retracted position. The control means comprises a latch which is engageable with a projection on the door shaft and a trip mechanism which is operated by the plunger. When the plunger is out of engagement with the trip mechanism, the latch holds the door in a closed position.

A principal object of this invention is to provide, in a continuously driven baler of the type described, an improved metering mechanism for feeding material to the baler.

Another object of this invention is to provide a horizontally extending bale case having a means for vertically distributing the material in the bale case before it is contacted by the plunger.

A further object of this invention is to provide a more efficient and economical arrangement of components in an industrial type baler.

Other objects of this invention will be apparent hereinafter from the specification and from the recital in the appended claims.

Brief description of the drawings

FIG. 1 is a side elevational view of the baler, with the plunger shown in a retracted position and with the door of the metering device open to allow material to be fed into the bale case;

FIG. 2 is an enlarged plan section, taken on the line 2—2 of FIG. 1, and showing the door of the metering device in a closed position;

FIG. 3 is an enlarged fragmentary elevational view of the door holding mechanism and also showing the latch of the control mechanism;

FIG. 4 is a side view taken in the direction indicated by the arrows 4—4 in FIG. 3;

FIG. 5 is a view similar to FIG. 3, but showing the plunger actuated latch in the inoperative position and showing the two extreme positions of the door;

FIG. 6 is an enlarged fragmentary elevational view of the plunger actuated trip, with the parts in the position they assume when the plunger is in a retracted position and in which position the latch is in the inoperative position of FIG. 5;

FIG. 7 shows the trip of FIG. 6 in the position the parts assume when the plunger is moving in its compression stroke; and FIG. 8 is a plan view of FIG. 6.

Description of the preferred embodiment

Referring now to the drawings by numerals of reference, and particularly to FIG. 1, the baler of this invention is designated generally by the numeral 10. Baler 10 comprises a horizontally extending bale case 11 mounted on legs 12, a plunger 13 reciprocable in the bale case for compressing material fed therein, a hopper 14 extending upwardly from the bale case, and a drive system 15 for powering the baler components. A metering device 17 extends into hopper 14 to regulate the flow of material into bale case 11.

Bale case 11 is of generally rectangular cross section and comprises a top wall 20, a bottom wall 21, and a pair of side walls 22 and 23. Material is fed into bale case 11 through a feed opening 25 and is moved toward a discharge end 26 as it is compressed and formed into bales. A constricting mechanism, indicated at 27, serves to restrict movement of the bales from the discharge end of the bale case and thus causes a predetermined baling pressure to be built up on the material so that the desired density is obtained.

A pair of holding strips 30 and 31, as shown in FIGS. 1 and 2, are mounted respectively on side walls 22 and 23 directly under feed opening 25. A portion of the material entering the bale case through feed opening 25 will collect on strips 30 and 31. Thus, the strips aid in effecting a vertical distribution of the material in the bale case so that the material is not concentrated in the bottom portion. It has been found that with the material distributed vertically in the bale case a substantially better bale shape is obtained. Channels 32 in the sides of plunger 13 receive strips 30 and 31 as plunger 13 reciprocates past them so that there is no interference between the plunger and the holding strips.

Drive system 15 comprises a motor 40 mounted on top wall 20 of the bale case. A chain drive indicated at 41 operatively connects motor 40 to a gearbox 42 fixed in bottom wall 21 of the bale case. Gearbox 42 is connected to plunger rod 43 through a crank 44. A chain drive 46 is connected to the underside of gearbox 42 and extends to a tying mechanism 50 located adjacent feed opening 25. Tying mechanism 50 is of conventional construction and comprises tying means 51 mounted on side wall 23 of bale case and needles, not shown, mounted on side wall 22 for feeding a tying strand to the tying means. A fan 53 is provided on side wall 23 to prevent foreign material from collecting on the tying means.

Hopper 14, best shown in FIGS. 1 and 2, comprises a window 60 mounted in front wall 61 and an access panel 62 slidably mounted on rear wall 63.

Metering device 17 comprises a door 65 which is mounted for swinging movement within hopper 14 and includes a shaft 66 journalled in hopper walls 61 and 63. A shield plate 67 extends vertically from adjacent an upper portion of hopper end wall 68 down to a point just above and over shaft 66 to prevent material passing through hopper 14 from interfering with the operation of shaft 66.

A holding mechanism is provided to maintain door 65 in a horizontal closed position until a predetermined amount of material has been accumulated on the door. The holding mechanism comprises a counterweight 70 which is adjustably positioned on an angled end portion 71 of door shaft 66. Counterweight 70 is held in adjusted position by set screw 72. An over-center mechanism 75 also aids in maintaining door 65 in a load accumulating closed position. Over-center mechanism 75, as best shown in FIGS. 3–5, comprises a bar 76 fixed at one end to shaft 66 and having a roller 77 carried on a fastener 78 at its opposite end. Roller 77 is adapted to be received in a groove 79 in element 80 which is pivotally mounted on a plate 81 fixed to wall 61 of the hopper. Element 80 is biased in either of the two over-center positions by a spring 82 adjustably connected to a bracket 83 by an eyebolt 84. It will be seen that movement of bar 76 is resisted by spring 82 until element 80 is flipped over center.

A control mechanism is associated with the door holding mechanism to prevent actuation thereof, even though sufficient material has been accumulated on the door, except when plunger 13 is in a retracted position. The control mechanism comprises a latch 90 having a member 91 pivotally mounted on plate 81 and a tab 92 at one end which cooperates with a projection 93 on door shaft 66. Member 91 is biased into engagement with projection 93 by a coil spring 94. When projection 93 is in contact with tab 92, downward movement of door 65 is prevented.

The control mechanism also includes a plunger operated trip 100, shown in FIGS. 1 and 6–8. Trip 100 comprises a bell crank 101 mounted to bale case side wall 23 at 102. A cable, or rope, 103 connects bell crank 101 to member 91. As shown in FIG. 1, cable 103 extends around a sheave 104 and is connected to member 91 through a spring 105. When plunger 13 is moved a short distance from the retracted position, bell crank 101 will move in the direction of stop 106, thereby decreasing the tension in cable 103, and member 91 will return to a horizontal position in contact with projection 93 on shaft 66. When plunger 13 returns to the retraced position, a roller 107, which is carried on a bracket 108 connected to plunger extension 109, will contact arm 110 of the bell crank 101 and move the bell crank into the position shown in FIG. 6. This movement of bell crank 101 causes tab 92 on member 91 to move out of contact with projection 93. Door 65 is then free to move to an open position, if sufficient material has been accumulated thereon to overcome counterweight 70 and the over-center mechanism 75.

In operation, material will be fed into hopper 14 of the baler by a blower or other conveying mechanism. The material will accumulate on door 65 until a sufficient quantity has been deposited to overcome the effects of the door holding mechanism which includes counterweight 70 and over-center mechanism 75. The charge of material, or quantity of material necessary to open door 65, can be regulated by moving counterweight 70 on shaft end portion 71 and by turning eyebolt 84 to change the tension in spring 82. Normally, these adjustments will be made when the type of material being baled changes so that the correct size charge is fed into the bale case for optimum baling conditions.

The holding mechanism cannot be actuated by the material on door 65, except when the plunger is in the retracted position because of the control mechanism described above. As the material enters the bale case through feed opening 25, a portion of it will be retained in the upper portion of the bale case by holding strips 30 and 31. The holding strips 30 and 31 are mounted upwardly from the bottom wall 21 on inner facing side surfaces of the walls 22 and 23, respectively, under and adjacent the feed opening 25. The strips project horizontally into the bale case converging towards each other in the direction of baling discharge. Thus, a vertical distribution of the material is obtained, and the advancing plunger 13 will contact the material over substantially the entire area of the plunger face. It has been found that a more uniform bale results when the material is so distributed in the bale case.

The baler of this invention is designed to operate continuously. However, because of the metering device provided with the baler, it is possible to operate the baler at slow speeds, and thus, the power consumed is relatively small. In one type of operation, the baler was operated at speeds as low as five revolutions per minute. It will be apparent that in operating the baler at this speed a high compressive force can be obtained with a small power input.

Having thus described our invention, what we claim is:
1. A baler comprising:
 a longitudinally extending bale case, said bale case having a top wall, bottom wall, and a pair of side walls, said top wall having a feed opening therein;
 a plunger reciprocable in said bale case from adjacent one end thereof past said feed opening and toward an opposite end of the bale case, said plunger being in a retracted position at said one end and in an extended position at said opposite end;
 a gearbox supported on said bottom wall at said one end and operatively connected to said plunger;
 a motor on said bale case top wall at said one end of the bale case and operatively connected to said gearbox, said motor being adapted to operate continuously to drive said plunger;
 tying means mounted on one of said side walls adjacent said feed opening, said tying means being operatively connected to said gearbox;
 a hopper supported on said bale case and having a discharge opening in communication with said feed opening;
 weight responsive metering means extending into said hopper for feeding charges of material of a predetermined weight including door-like means having an open position for passing material and a closed position for blocking material, holding means for maintaining said door-like means in a closed position for accumulation of a charge of material of a predetermined weight and being responsive to a charge of material of a predetermined weight on said block- ing means to release said blocking means for movement to an open position passing the charge into said bale case; and control means operatively connected to said holding means to prevent release of said loor-like means except when said plunger is in the retracted position.

2. In a baler having a generally horizontally extending bale case with a feed opening in a top wall thereon, a plunger reciprocal in said bale case, a vertically extending hopper in communication with said feed opening, the improvement comprising a door in said hopper movable from a generally horizontal closed position to a substantially vertical open position, said door comprising a shaft pivotally mounted in said hopper, a counterweight on said shaft and extending generally opposite to said door, a radial projection on said shaft, a pivotally mounted latch element spring-biased into contact with said projection to prevent rotation of said shaft, a bar on said shaft and in contact with an over-center mechanism, and a trip on said bale case and operatively connected to said latch element.

3. A baler, as recited in claim 1, wherein strip means is mounted on at least one of said bale case side walls adjacent said feed opening to extend longitudinally within said bale case to vertically distribute material being fed into said bale case.

4. A baler comprising:
a longitudinally extending bale case, said bale case having a top wall and a feed opening therein;
a plunger reciprocable in said bale case and movable from adjacent one end of the case toward a discharge end to compress material fed into said bale case;
a hopper having opposite side walls and a discharge opening in communication with said feed opening;
a door pivotally mounted in said hopper and movable from a closed position to an open position;
holding means for maintaining said door in the closed position and adapted to be actuated when a predetermined amount of material has been accumulated in said hopper; and
control means operatively connected to said holding means to prevent actuation thereof except when said plunger is adjacent said one end, said control means comprising trip means mounted on said bale case adjacent said one end and adapted to be actuated by said plunger.

5. A baler, as recited in claim 4, wherein said door includes a shaft which extends through said opposite hopper side walls, and said holding means comprises a counterweight fixed to said shaft and an over-center mechanism adapted to resist movement of said door for a portion of its travel from the closed to the open position.

6. A baler, as recited in claim 5, wherein said control means comprises a projection on said shaft; a latch pivotally mounted on one of said hopper side walls adjacent said shaft on said door, said latch is adapted to contact said projection on said shaft to prevent rotation thereof, and said latch is operatively connected to said trip means.

7. In a baler having a generally horizontally extending bale case through which material is moved to a discharge end, said bale case having a top wall, bottom wall, and a pair of side walls, with facing inner surfaces, said top wall having a feed opening therein, means for feeding material to be baled through said feed opening, the improvement comprising a holding strip with said bale case on said inner surface of one of said side walls, said strip being spaced upwardly from said bottom wall and extending longitudinally in said bale case, and said strip being adapted to collect a portion of the material fed into said bale case to effect a vertical distribution of the material.

8. In a baler, as recited in claim 7, wherein a second holding strip is mounted on the other of said side walls, said strips extend generally in a longitudinal direction, and said strips converge toward each other in the direction of said discharge end.

References Cited

UNITED STATES PATENTS

| | | | |
|---|---|---|---|
| 2,158,745 | 5/1939 | Dalimata | 100—45 |
| 594,008 | 11/1897 | Hanak | 141—80 |
| 1,285,895 | 11/1918 | Armstrong | 100—187 XR |
| 2,393,130 | 1/1946 | Toulmin. | |
| 2,646,745 | 7/1953 | Seltzer | 100—4 XR |
| 2,772,628 | 12/1956 | Nolt | 100—4 |
| 2,938,451 | 5/1960 | Seltzer | 100—4 |
| 3,266,096 | 8/1966 | Thomas et al. | |
| 3,408,927 | 11/1968 | Willock | 100—53 |

FOREIGN PATENTS 650,785   10/1962   Canada.

BILLY J. WILHITE, Primary Examiner

U.S. Cl. X.R.

100—188, 215